March 27, 1934.  C. D. STEWART ET AL  1,952,391

PISTON SEAL

Filed Jan. 28, 1932  2 Sheets-Sheet 1

INVENTOR.
CARLTON D. STEWART.
CLYDE C. FARMER.

By *Wm. M. Cady*

ATTORNEY.

March 27, 1934.  C. D. STEWART ET AL  1,952,391
PISTON SEAL
Filed Jan. 28, 1932   2 Sheets-Sheet 2

INVENTOR.
CARLTON D. STEWART.
CLYDE C. FARMER

By *Wm. M. Cady*

ATTORNEY.

Patented Mar. 27, 1934

1,952,391

UNITED STATES PATENT OFFICE 1,952,391

PISTON SEAL

Carlton D. Stewart, Berkeley, Calif., and Clyde C. Farmer, Pittsburgh, Pa., assignors to The Westinghouse Air Brake Company, Wilmerding, Pa., a corporation of Pennsylvania Application January 28, 1932, Serial No. 589,422

4 Claims. (Cl. 303—1)

This invention relates to fluid pressure operated devices, and more particularly to valve devices such as are employed in fluid pressure brake equipment.

Considerable difficulty has been encountered in valve devices of the above mentioned type in providing adequate means for retaining a gasket in such a manner as to insure the effecting of a proper seal when the valve piston engages the gasket. The principal reason for the difficulty is due to the fact that the gaskets buckle upon the application of clamping pressure for retaining the cover and gasket in position on the valve casing. The buckling caused by this pressure results in a distortion of the gasket which is liable to permit leakage past the piston and result in improper operation of the device.

The primary object of the present invention is the provision of means for preventing the buckling of the gaskets and thus insuring the proper operation of the devices.

Another object of the present invention resides in the provision of improved means for retaining the gaskets in position in the devices.

A further object resides in the provision of improved anchoring means for a gasket which will prevent the gasket from buckling upon the application of the clamping pressure in order to retain the cover on the valve device.

Other objects and advantages will appear from the following description of illustrative embodiments of the present invention.

In the drawings:—

Figure 1:
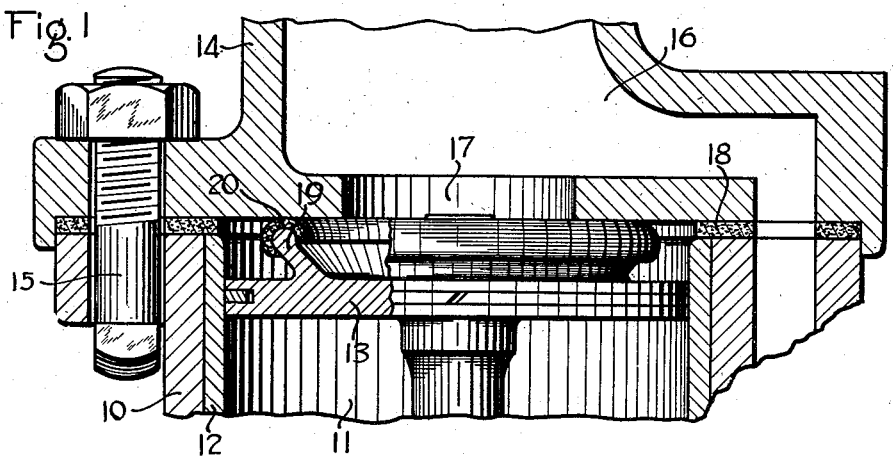
Fig. 1 is a fragmentary sectional view of a valve device, showing one form of the present invention applied thereto.

The valve device shown in the accompanying drawings, is of the type employed in fluid pressure brake equipment and comprises a casing 10, having a piston chamber 11 containing a rust proof bushing 12 in which a piston 13 is adapted to operate. A cover portion 14, which is adapted to be retained upon the casing 10 by the application of bolts 15, contains a chamber 16, which is in open communication with the piston chamber 11 through a passage 17. A gasket 18, positioned between the casing 10 and cover portion 14, serves to provide an air tight joint between the members.

According to the construction shown in Fig. 1, the piston 13 is provided with an upstanding annular rib or ring 19, which is preferably formed integral with the piston 13. An annular gasket 20, preferably formed of resilient material, is adapted to be received upon the rib 19 and serves as a seal when the piston moves to a position in which the gasket 20 is compressed against the face of the cover portion 14. The gasket 20 is so shaped that by slight distortion it may be snapped in place on the rib 19, where it is yieldably retained by its inherent resiliency. In this manner, an improved piston seal may be provided by the application of a gasket to the piston so as to preclude the possibility of distortion, since it is independent of and unaffected by the application of clamping pressure to compress the casing gasket.

Figure 2:
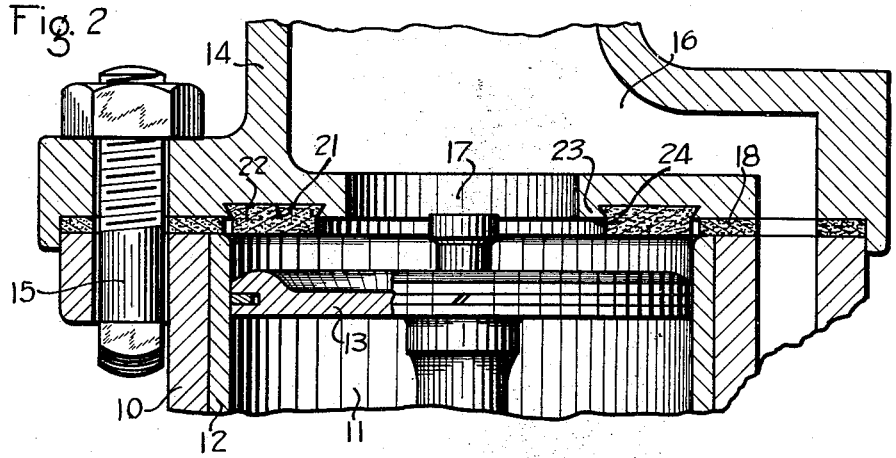
Fig. 2 is a fragmentary sectional view of a valve device, showing a modified form of the present invention applied thereto.

In the modified form of the invention shown in Fig. 2 of the drawings, the face of the cover portion 14 is provided with an annular groove 21 adapted to receive and retain a resilient annular gasket 22. The groove 21 is of dove tail form and its undercut sides 23 are adapted to engage flared sides 24 formed at the base of the gasket 22. The gasket 22 may readily be applied to the groove 21 by the application of pressure to the sides of the gasket so as to deform it a sufficient amount to permit the base portion of the gasket to be inserted through the mouth of the groove 21. Upon release of pressure on the gasket it will spread until the flared sides 24 engage the walls 23 to thus provide an anchoring means for the gasket 22, which will prevent its accidental displacement. It will readily be understood that the use of this independent mounting means for the piston seal gasket 22, will serve to insure against distortion of the piston gasket upon the application of clamping pressure to compress the gasket 18 to provide a seal between the casing 10 and the cover portion 14.

Figure 3:
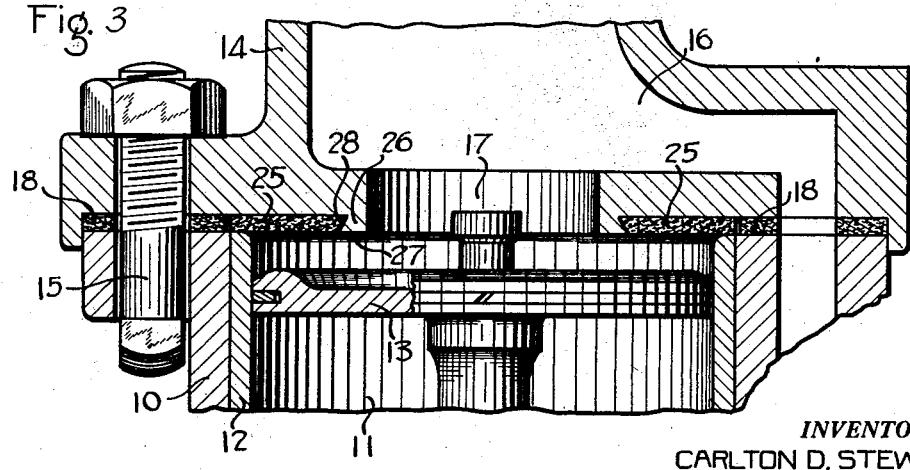
Fig. 3 is a view similar to Fig. 2, showing modification of the form of the invention shown in that figure.

In Fig. 3 of the drawings, a modified form of the device illustrated in Fig. 2 is shown. In this embodiment of the invention, a piston seal gasket 25 is provided. The gasket 25 is provided with a beveled inner edge 26 adapted to be snapped into position over a flange 27 on the cover portion 14. The flange 27 is provided with an undercut face 28 adapted to engage and retain the inner edge of the gasket 25. The diameter of the gasket 25 is such that a clearance is provided between its outer edge and the inner edge of the gasket 18. This clearance is provided so that the piston gasket 25 will not be effected upon the tightening of the bolts 15 which compress the gasket 18. The bushing 12 engages the outer portion of the piston seal gasket 25 so as to retain it tightly against the cover portion 14. Since both inner and outer edges of the gasket 25 are anchored, the possibility of distorting the gasket is eliminated and an effective piston seal may also be obtained in this manner.

Figure 4:
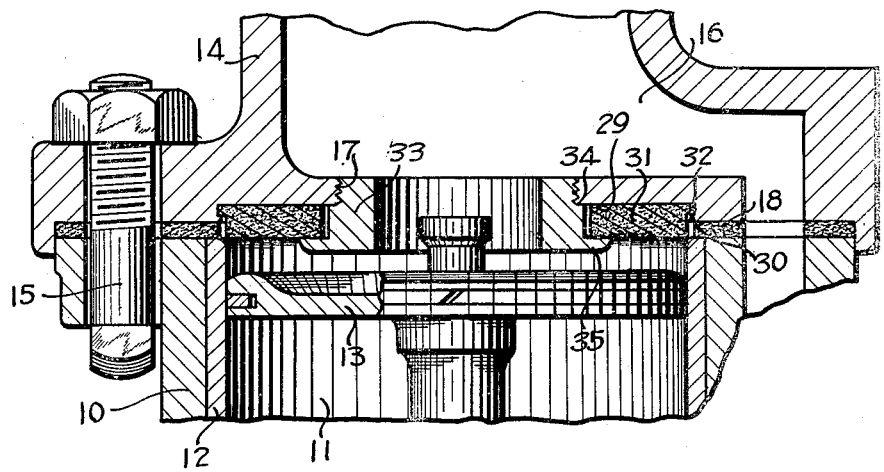
Fig. 4 is a fragmentary sectional view of a valve device, showing a further modified form of the present invention.

Another modification of the invention is shown in Fig. 4 of the drawings. A gasket seat 29 is formed in the cover portion 14. A flange 30 formed on the cover portion 14 overlies the outer edge of the seat 29, so as to form an anchoring means for a piston seal gasket 31, which is provided with a flange 32 adapted to be snapped under the flange 30 to releasably retain the outer edge of the gasket 31 on the seat 29. The passage 17 in the cover 14 is tapped to receive the screw threads formed on an anchor nut 33. A flange 34 on the anchor nut 33 serves as a stop to limit the inward movement of the nut, and a second flange 35 formed on the nut overlies the inner portion of the piston seal gasket 31. The space between flanges 34 and 35 is approximately equal to the thickness of the gasket 31, so that the application of the nut 33 serves only to insure the proper positioning and retention of the gasket 31 and does not exert any distorting clamping pressure upon the gasket. Again it will be seen that the clamping pressure of the bolts 15, utilized in securing the cover 14 to the casing, will in no way effect the piston gasket 31.

Figure 5:
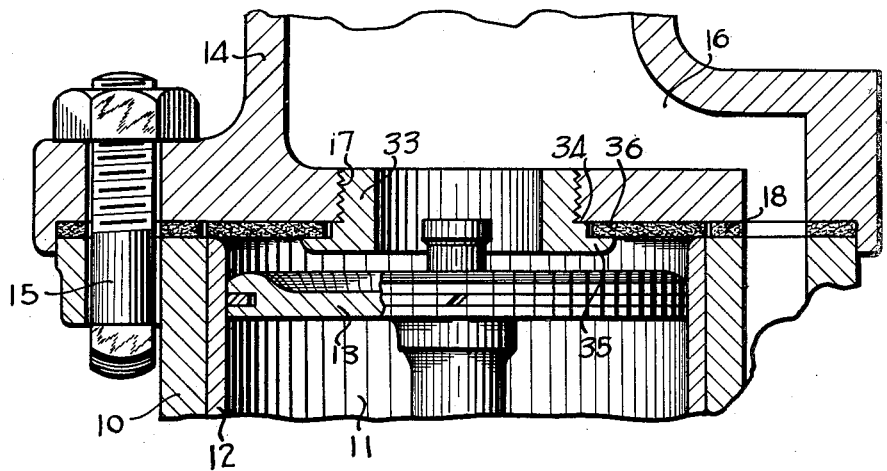
Fig. 5 is a view similar to Fig. 4, showing a modification of the form of the invention shown in Fig. 4.

The form of the device shown in Fig. 5 embodies the combined characteristics of the forms shown in Figs. 3 and 4. In this instance a piston seal gasket 36 having a thickness equal to that of the gasket 18 is releasably retained upon the cover 14 by the application of the nut 33, which is threaded into the passage 17. The flanges 34 and 35 serve in the manner previously described and the nut 33 provides an anchorage for the inner edge of the gasket 36. The outer edge of the piston gasket 36 is spaced from the inner edge of the gasket 18, so as to provide a clearance sufficient to accommodate the distortion of the gasket when the cover is applied to the casing. The outer portion of the piston gasket 36 is held securely to the cover portion 14 by the bushing 12. The relatively small area of the bushing which exerts pressure upon the outer portion of the gasket, is of insufficient size to cause distortion of the gasket 36. The pressure exerted by the bushing will merely cause the material of the gasket 36 to flow outwardly where it is readily accommodated in the clearance space provided between the adjacent edges of the gaskets 18 and 36.

It will readily be seen from the foregoing description that several improved means have been provided to insure against the possibility of distortion or buckling of the piston seal gasket, which difficulty has, in the past, resulted in improper operation of the devices due to leakage where an imperfect seal was caused by the distortion of the gasket.

By the use of any of the above described forms of the present invention, it is possible to provide various means whereby the piston seal gasket is in no way affected by the application of pressure to maintain the cover and cover gasket tightly upon the casing. By utilizing a separate piston seal gasket and providing means independent of the cover gasket for retaining the piston gasket in desired position, it is possible to provide a piston gasket which is adapted to insure a perfect seal due to its resiliency and undistorted condition.

While several forms of the invention have been described in detail in the foregoing specification, it is understood that various changes may be made in its embodiments without departing from or sacrificing any of the advantages hereinafter claimed.

Having now described our invention, what we claim as new and desire to secure by Letters Patent, is:

1. The combination with a fluid pressure operated device having a casing containing a piston chamber and piston, a cover portion adapted to close one end of said chamber, of a pair of resilient annular gaskets, one of said gaskets adapted to provide a seal between said casing and cover portion, the other of said gaskets adapted to provide a seal between said cover portion and said piston, and means on said cover portion for releasably retaining the inner edge of said last named gasket, the outer edge of said last named gasket being retained between said casing and cover portion.

2. The combination with a fluid pressure operated device having a casing containing a piston chamber and piston, a cover portion adapted to close one end of said chamber, of a pair of resilient annular gaskets, one of said gaskets adapted to provide a seal between said casing and cover portion, the other of said gaskets adapted to provide a seal between said cover portion and said piston, said first named gasket and the outer edge of said second named gasket adapted to be retained between said cover portion and said casing, and means on said cover portion for retaining the inner edge of said second named gasket.

3. The combination with a fluid pressure operated device having a casing containing a piston chamber and piston, a cover portion adapted to close one end of said chamber, of a pair of resilient annular gaskets, one of said gaskets adapted to provide a seal between said casing and cover portion, the other of said gaskets adapted to provide a seal between said cover portion and said piston, said first named gasket and the outer edge of said second named gasket adapted to be retained between said cover portion and said casing, and a nut on said cover portion having a flanged portion adapted to retain the inner edge of said second named gasket.

4. The combination with a fluid pressure operated device having a casing containing a chamber and a piston, a cover portion adapted to close one end of said chamber, of a pair of concentric annular resilient gaskets, one of said gaskets adapted to provide a seal between said casing and said cover portion, the other of said gaskets having an outside diameter smaller than the inside diameter of said first named gasket, said other gasket adapted to provide a seal between said piston and said cover portion, said first named gasket and the outer edge of said other gasket adapted to be retained between said casing and said cover portion, and means on said cover portion for retaining the inner edge of said other gasket.

CARLTON D. STEWART.
CLYDE C. FARMER.